United States Patent [19]

Auracher et al.

[11] 4,165,225
[45] Aug. 21, 1979

[54] DISTRIBUTOR FOR OPTICAL SIGNALS

[75] Inventors: Franz Auracher, Munich; Rolf Kersten, Rottach-Egern, both of Fed. Rep. of Germany

[73] Assignee: Siemens Aktiengesellschaft, Berlin & Munich, Fed. Rep. of Germany

[21] Appl. No.: 875,526

[22] Filed: Feb. 6, 1978

Related U.S. Application Data

[62] Division of Ser. No. 668,698, Mar. 19, 1976, abandoned.

[30] Foreign Application Priority Data

Apr. 17, 1975 [DE]  Fed. Rep. of Germany ....... 2516975

[51] Int. Cl.$^2$ .............................................. C03C 27/00
[52] U.S. Cl. .......................................... 65/4 B; 65/31; 65/DIG. 7; 156/296; 350/96.15; 350/92.28
[58] Field of Search ................ 65/4 B, 31, DIG. 7; 350/96.15, 96.28; 156/180, 294, 296

[56] References Cited

U.S. PATENT DOCUMENTS

| 2,506,672 | 5/1950 | Kell et al. ........................ 350/96 R |
| 2,881,976 | 4/1959 | Grennias .......................... 350/96 R |

FOREIGN PATENT DOCUMENTS

| 1369010 | 6/1964 | France ............................. 350/96 B |
| 1372578 | 10/1974 | United Kingdom ............ 350/96 B |

OTHER PUBLICATIONS

Ohacchi, "Electro-optic Light Modulator with Branched Ridge Waveguide", Applied Physics Letters, vol. 27, No. 10, pp. 544-4611, (1975).
Boivin, "Thin-Film Laser-to-Fiber Coupler", Applied Optics, vol. 13, No. 2, Feb. 1974, pp. 391-395.

*Primary Examiner*—Robert L. Lindsay, Jr.
*Attorney, Agent, or Firm*—Hill, Van Santen, Steadman, Chiara & Simpson

[57] ABSTRACT

A distributor for optical signals characterized by a waveguide structure disposed on the substrate. The waveguide structure has an input and a plurality of output ends with a tree-like branching structure having at least one branching point with two curved branching sections extending therefrom. Each of the curved branching sections has a radius of curvature great enough so that the guiding of optical signals in the branching section is not impaired.

4 Claims, 3 Drawing Figures

4,165,225

DISTRIBUTOR FOR OPTICAL SIGNALS

This is a division of application Ser. No. 668,698 filed Mar. 19, 1976 now abandoned.

BACKGROUND OF THE INVENTION

The present invention is directed to a distributor for optical signals which consists of a substrate with a waveguide structure having a single input and a plurality of output ends disposed thereon.

In optical communication transmission systems, passive and controllable branching is necessary. Controllable branching can be realized with the aid of mechanical arrangements. Passive branching can be produced directly into a light guiding fiber segment. For optical repeater stations and other complex optical components which are constructed by a hybrid technology, it is desired to have both passive and controllable distributors for the optical signals at branching points of an optical communication transmission route which distributors function in a pure optical manner.

SUMMARY OF THE INVENTION

The present invention is directed to providing a distributor of optical signals which distributor may be inserted at various points of an optical communication system.

To accomplish this feature, the distributor comprises a substrate and a substantially planar waveguide structure mounted thereon, said waveguide structure having a single input end connected by a tree-like branching structure to a plurality of output ends, said branching structure having at least one branching point connecting a segment of the waveguide structure with two curved branching sections extending therefrom, each of said curved branching sections having a radius of curvature great enough that the guiding of an optical signal in the branching section is not impaired so that a light signal applied to the input end is guided through at least one branching point and a branching section of the waveguide structure to each of the output ends.

The waveguide structure may be either formed in a dielectric material having an index of refraction greater than the surrounding materials such as the substrate or may be formed as a hollow metallic guide structure. Preferably, the dimensions of the input end of the waveguide structure corresponds to the dimension of the core of the fiber connected thereto and the dimension of each of the output ends of the waveguide structure correspond to the dimensions of the core of the fiber connected to the output end. Preferably, the distributor when used with optical fibers includes means disposed adjacent each of the input end and output end for locating the end of an optical fiber at each of said ends. These means are preferably alignment grooves formed on the substrate.

DESCRIPTION OF THE PREFERRED EMBODIMENTS

Figure 1:
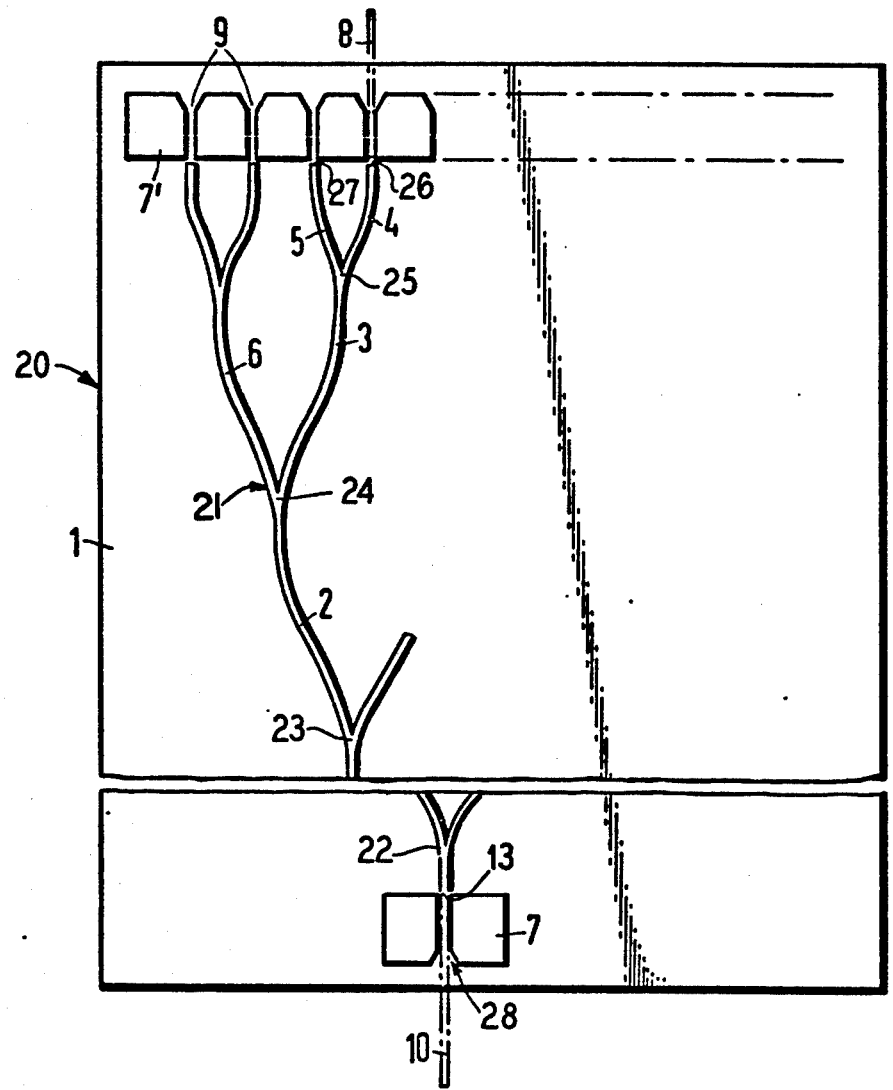
FIG. 1 is a plan view with portions broken away for purposes of illustration of a distributor in accordance with the present invention.

The principles of the present invention are particularly useful when incorporated in a distributor 20 generally illustrated in FIG. 1. The distributor 20 comprises a substrate 1 and a waveguide structure generally indicated at 21 disposed on the substrate 1.

The waveguide structure 21 has a segment forming an input end 13, which may have a wide cross section. The segment extending from the input end 13 extends to a first branching point 22 which has two curved branching segments or sections extending therefrom. As best illustrated in FIG. 1, a branching section or segment 2 of the structure 21 extends from a branching point 23 to a branching point 24 and two curved branching segments 3 and 6 extend therefrom. The curved branching segment 3 extends to another branching point 25, which has two curved branching sections 4 and 5 extending to the output ends 26 and 27, respectively. Each of the branching segments has a radius of curvature which is at least large enough so that the propagation of a light signal therein is not impaired. The configuration of the branching segments or sections and the branching points provide a tree-like branching structure for the structure 21.

In the embodiment illustrated in FIG. 1, the substrate 1 is provided with means 7 adjacent the input end 13 for holding a glass fiber 10, illustrated in broken lines, in alignment for coupling with the input end 13. As illustrated, the means 7 comprises raised portions on the substrate 1 which portion provides a guide groove 28 for receiving the fiber 10. In a similar manner, means 7' are provided adjacent each of the output ends such as 26 and 27 to align fibers such as 8 (illustrated in broken lines) with the output ends such as 26. The means 7' is formed by a plurality of raised portions such as the substrate 1 which portions provide guide grooves such as 9 which hold an end of a glass fiber at each of the output ends, such as fiber 8 at the output end 26.

The wide input end 13 has a dimension corresponding to the dimensions of a core of the light conducting fiber such as glass fiber 10. The output ends 26 and 27 each have a dimension corresponding to the core of the light conducting fiber such as 8, which, as illustrated, is of the same dimension as the fiber 10.

The waveguide structure 21 lies substantially in the plane on the substrate and may be formed of a dielectric material whose index of refraction is higher than the index of refraction of the substrate 1 and the surrounding material. In addition, the waveguide structure 21 may be formed of a metallic hollow guide structure.

Whether the waveguide structure 21 is formed of a dielectric material or a metallic hollow guide structure, the coupled in optical signal is guided in the structure and its light energy is divided at each of the branch points such as 24 into the two branching waveguide segments or sections extending therefrom, such as sections 3 and 6. If the width of the waveguide structure is large compared to the wavelength of the optical signal, then the light energy is distributed according to the relationship of the cross-sectional area of the branching waveguides such as 3 and 6. With a narrow waveguide structure, the distribution of the light energy in each of the segments extending from a branching point will depend on the energy distribution in the segment leading to the branching point.

In certain cases, it is desirable to monitor the signal being distributed. In such a case, a photo detector is directly coupled to one of the branch segments or to an output end. The photo detector will convert the optical signal into electrical signal. By applying the electrical signal to a device, such as an oscilloscope, the information being transmitted through the distributor 20 can be monitored.

The distributor 20 formed of a dielectric material, may be produced by first preparing a mask of the desired structure of the configuration of the structure 21. The mask is utilized in a standard photolithographic process to produce the desired structure 21. However, branching structures require a thickness in the order of 100 μm and such a structure is difficult to achieve with standard photo resists.

Thus, the structure 21 may be formed or produced by utilizing thin sheets or foils of light sensitive material which can be laminated to the required thickness of approximately 100 μm. Such sheets or foils are known and are sold under a trademark RISTON. A quartz substrate 1 having an index of refraction $n_1 = 1.46$ may be coated with the laminated sheets which have an index of refraction $n_2 = 1.50$. The substrate with the laminated sheets is then exposed with the desired pattern to produce the branching structure as well as the desired pattern for producing the alignment means such as 7 and 7' for aligning glass fibers with respect to the input end 13 and output end of the structure 21. After exposure, the laminated sheets are developed to leave the waveguide structure 21 and the raised portions 7 and 7' which produce the grooves 28 and 9, respectively.

When utilizing the laminated sheets and due to light diffraction during the exposure of the sheets, one obtains a slight undercutting of the remaining profile. Thus, grooves such as 28 or 9 will be slightly narrower at the top surface than at the bottom surface adjacent the substrate 1. If the exposure time is just right, one obtains grooves with a top which is a few μm narrower than the glass fiber diameter. Thus, during assembly of the optical fibers 10 with the input end 13 of the distributor 20, a fiber 10 is simply slipped along the top of the groove 28 until the end of the fiber engages the input end 13 of the waveguide structure 21 and then the fiber 10 is pressed and snapped into the groove 28 which will firmly hold the fiber in place.

It should be noted that in order to utilize the inventive distributor 20 with ordinary light guiding fibers, the waveguide structure 21 must be produced with its cross-sectional dimensions being equal to the dimensions of the core of the fibers being used.

Instead of using the laminated layers or foil to produce a sufficiently thick layer for the structure 21, it is possible to utilize photo resist which was applied on the substrate in multiple applications to obtain the desired thickness.

An advantage of this method is based on the fact that the same photolithographic process can be utilized to produce the waveguide structure 21 and to provide the guide grooves such as 9 and 28, respectively, for the glass fibers that are to be coupled into the input end 13 and the output ends.

As mentioned above, a metallic hollow guide structure can be used instead of a dielectric structure. To use a metallic hollow guide structure as the waveguide structure 21, a metallic substrate or a substrate that has a metallized surface is used. A photo resist layer or a light sensitive foil is applied on the surface and exposed by means of a photolithographic process to produce a core for each segment of the waveguide section. After developing the photographic layer or the light sensitive foil, the core is metallized by electroplating to encase the core. Upon completion of the electroplating process the core formed of the photo lacquer or foil is then separated by conventional means to leave the hollow metallic guide structure.

Figure 2:
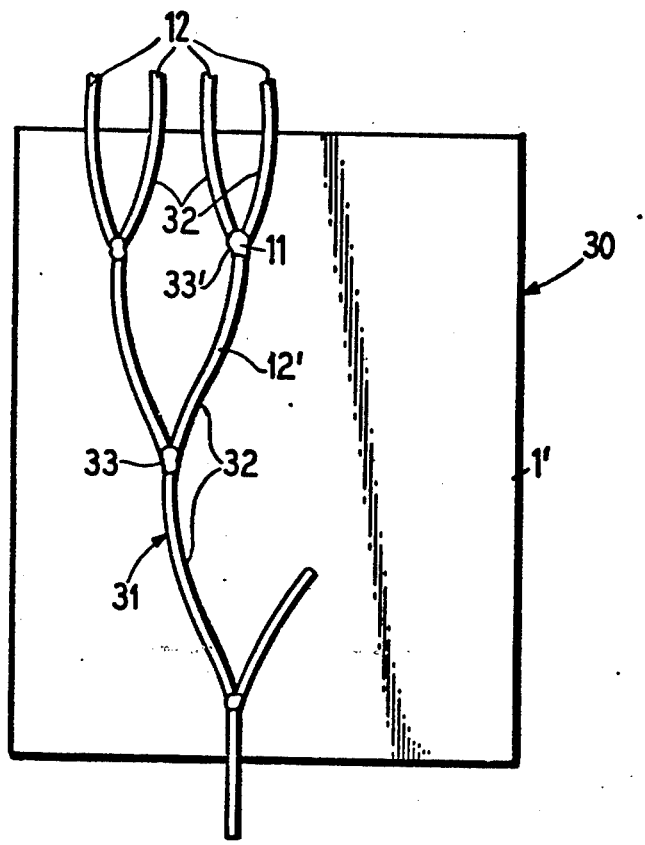
FIG. 2 is a plan view of an embodiment of the distributor in accordance with the present invention.

An embodiment of the distributor is generally indicated at 30 in FIG. 2 and has a waveguide structure 31 supported on a substrate 1'. In this embodiment, instead of producing a light waveguide structure of the distributor directly by means of planar technology in a light sensitive synthetic material, guide grooves 32, which have the configuration of the waveguide structure 31 with branching points 33 and 33' are formed on the surfaces of the substrate 1'. Cladded light conducting fibers 12 and 12' are laid in the grooves 32 with their ends closely spaced together at branching points such as 33 and 33'. The fibers such as 12' were cut to a length to extend from one branching point 33 to the next point 33'. The intermediate space between the ends of the fibers 12 and 12' at a branching point such as 33' can be filled with an immersing adhesive e.g. epoxy resin such as 11 or with a photo resist. If a photo resist is used, it can be further treated by being exposed to light and developed in such a way that a form fitting connection between the ends of the individual fibers 12 and 12' occurs. The guide grooves such as 32 for the fibers 12 and 12' can be formed directly into the substrate 1' by applying a light sensitive foil or layer on the surface of the substrate 1', exposing the foil or layer with the desired pattern. The exposed layer is then developed to form an etching mask which is utilized for etching the guide grooves 32 into the substrate 1'.

Figure 3:
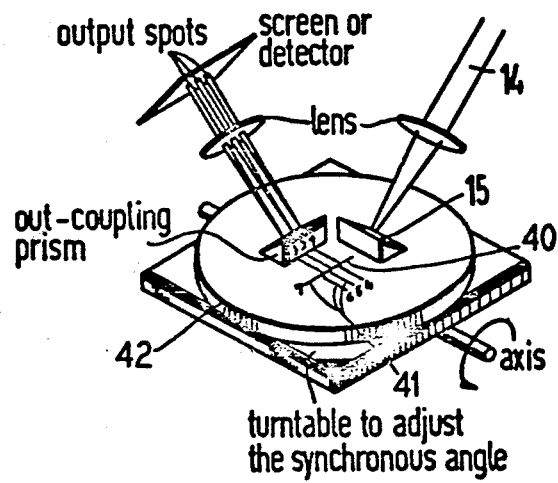
FIG. 3 is a perspective view of a device utilizing the distributor of the present invention.

A more detailed description of a sample embodiment of the present invention is illustrated in FIG. 3. In this embodiment, a waveguide structure has a broad strip waveguide segment 40 which is divided or branched into several smaller guide sections 41 so that light coupled into the broad strip waveguide segment 40 is split into the branching segments or sections 41. In general, one would need to add a tapered section which changes the width of the monomode strip waveguide to the broad strip segment 40 which is utilized. The branching structure was fabricated by ion implantation of either B or Li ion (200 keV–300 keV with a density of $10^{15}$ ions/cm$^2$) into a fused quartz substrate 42 which was provided with a mask. The mask utilized during the ion implantation is for instance formed from a photo resist of a thickness of 0.5 μm which photo resist was exposed and developed in accordance with a standard photolithographic process. The overall dimensions of the waveguide structure of the distributor are approximately 6×6 mm, the initial waveguide 40 has a width of approximately 170 μm and the branching sections 41 have a width of approximately 13 μm with a radius of curvature of 1.5 mm. During the implantation process, a waveguide structure is produced only in the unmasked regions of the fused quartz substrate 42.

In operation, a beam of light 14 of different wavelengths from a krypton laser can be coupled into the implanted waveguide structure by means of a leaky wave prism-film coupler 15. By adequate coupling, all branching sections 41 are excited with about the same intensity.

The passive distributor such as 20 or 30 of the present invention, can be used at the following points in an optical communication system, which points are at the beginning of a transmission line or system, at an incoming optical transmission line, and at a repeater station.

When used at the beginning of a transmission line or system, several optical transmission lines may be excited by a single light transmitter which is coupled into the input end 13 of the distributor such as 20. The waveguide dimensions and materials of the input end of the waveguide structure 21 or 31 are adapted to satisfy the requirements of the light transmitter in order to achieve the greatest possible degree of coupling efficiency. The optical transmission line, for example the light guiding fibers, are coupled to the output ends, such as 26 and 27, of the waveguide structure.

When a distributor such as 20 is used at an incoming optical transmission line, the input end, such as 13, is directly coupled to an optical fiber, such as 10, instead of to a light transmitter. Thus, the optical fiber 10 is interposed between the input end 13 and the transmitter that produces the optical signals.

When the distributor is used at a repeater station, the input end is coupled to the output of the repeater which functions as an amplifier for the signals being transmitted.

Although various minor modifications may be suggested by those versed in the art, it should be understood that we wish to employ within the scope of the patent granted hereon, all such modifications as reasonably and properly come within the scope of our contribution to the art.

We claim:

1. A method of forming a distributor of optical signals comprising a substrate, a substantially planar waveguide structure provided on the substrate, said waveguide structure being a metallic hollow guide structure and having a single input end connected by a tree-like branching structure to a plurality of output ends, and means disposed on said substrate adjacent each of said input and output ends for locating an end of an optical fiber at each of the ends, said branching structure having at least one branching point interconnecting a segment of the waveguide structure with two curved branching sections extending therefrom, each of said curved branching sections having a radius of curvature great enough that the guiding of optical signal in the branching section is not impaired, said method comprising providing a substrate with a metallic surface; forming a waveguide structure on a surface of the substrate by applying a layer of light sensitive material on the metallic surface, exposing the light sensitive material through a mask to produce a core of each segment of the waveguide structure, developing the exposed photosensitive layer to leave the cores on the surface, metallizing the surfaces of the cores, and then removing the cores to leave the metallic hollow guide structure; and forming said means for locating on said substrate.

2. A method according to claim 1, wherein the step of providing a substrate with a metallic surface comprises providing a substrate and metallizing a surface of the substrate to provide said metallic surface.

3. A method of forming a distributor of optical signals comprising a substrate, a substantially planar waveguide structure provided on the substrate, said waveguide structure having a single input end connected by a tree-like branching structure to a plurality of output ends, and means disposed on said substrate adjacent each of said input and output ends for locating an end of an optical fiber at each of the ends, said branching structure having at least one branching point interconnecting a segment of the waveguide structure with two curved branching sections extending therefrom, each of said curved branching sections having a radius of curvature great enough that the guiding of optical signal in the branching section is not impaired, said method comprising providing a substrate; forming a waveguide structure on a surface of the substrate; and forming said means for locating on said substrate; said step of forming the waveguide structure comprising applying a layer of photosensitive material on the substrate, exposing the layer through an appropriate mask having a configuration of the waveguide structure, developing the exposed layer to remove portions thereof to form a pattern of grooves corresponding to the shape of the waveguide structure and subsequently assembling waveguides in the grooves to complete the waveguide structure.

4. A method according to claim 3, wherein the step of assembling comprises providing individual waveguides of a length to extend from one branch point to another, placing the individual waveguides in the grooves with their ends disposed at the branch points and then providing an immersion material between the ends of the individual waveguide at the branch point to complete the connection therebetween.

* * * * *